Jan. 8, 1935.　　　　J. GROSS　　　　1,987,557
LAWN MOWER SHARPENER
Filed Nov. 6, 1933　　2 Sheets-Sheet 1

John Gross INVENTOR
BY Victor J. Evans & Co.
ATTORNEY

Jan. 8, 1935. J. GROSS 1,987,557
LAWN MOWER SHARPENER
Filed Nov. 6, 1933 2 Sheets-Sheet 2
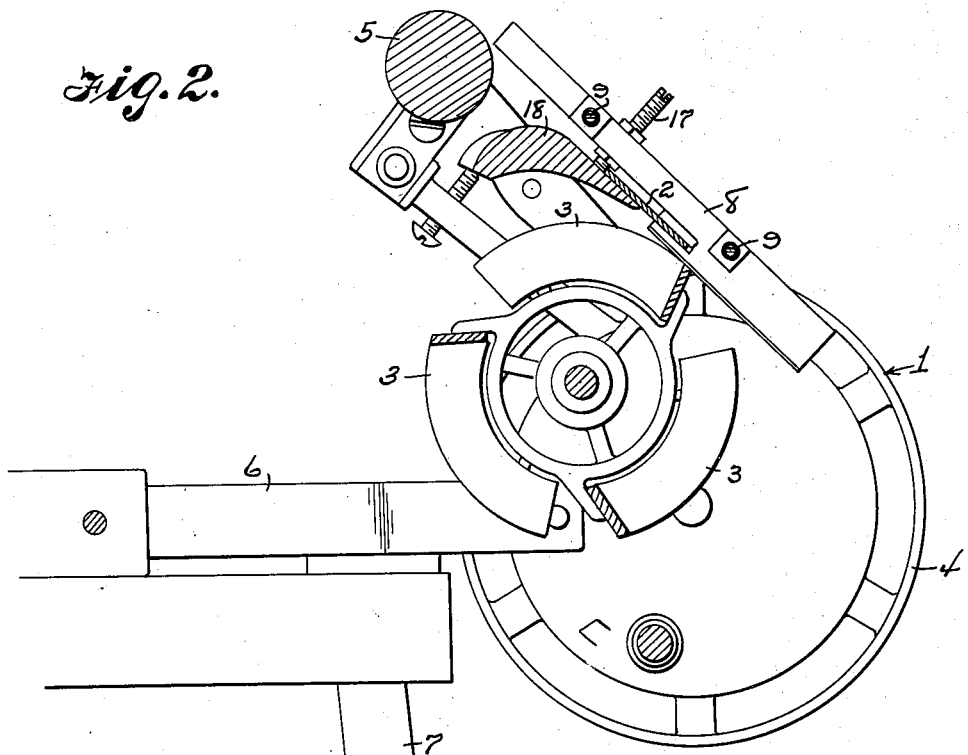
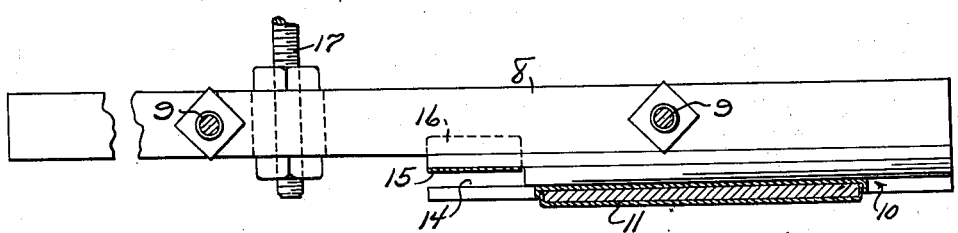
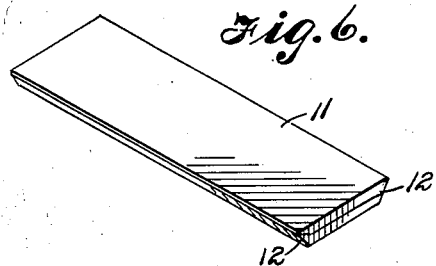
John Gross INVENTOR
BY Victor J. Evans & Co.
ATTORNEY Patented Jan. 8, 1935

1,987,557

UNITED STATES PATENT OFFICE 1,987,557

LAWN MOWER SHARPENER

John Gross, Minneapolis, Minn.

Application November 6, 1933, Serial No. 696,878

1 Claim. (Cl. 51—250)

This invention relates to a lawn mower sharpener and has for the primary object the provision of a device of the above stated character which may be easily and quickly applied to a lawn mower and with the latter suitably supported and the wheels rotated so that the blades thereof may be efficiently sharpened by having wiping contact with the device.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a fragmentary bottom plan view illustrating a lawn mower with my invention applied thereto.

Figure 2 is a transverse sectional view illustrating a lawn mower positioned for sharpening and having my invention applied thereto.

Figure 5 is a sectional view taken on the line 5—5 of Figure 3.

Figure 6 is a perspective view illustrating the sharpening element.

Figure 7 is a perspective view illustrating a wear plate.

Figure 1:
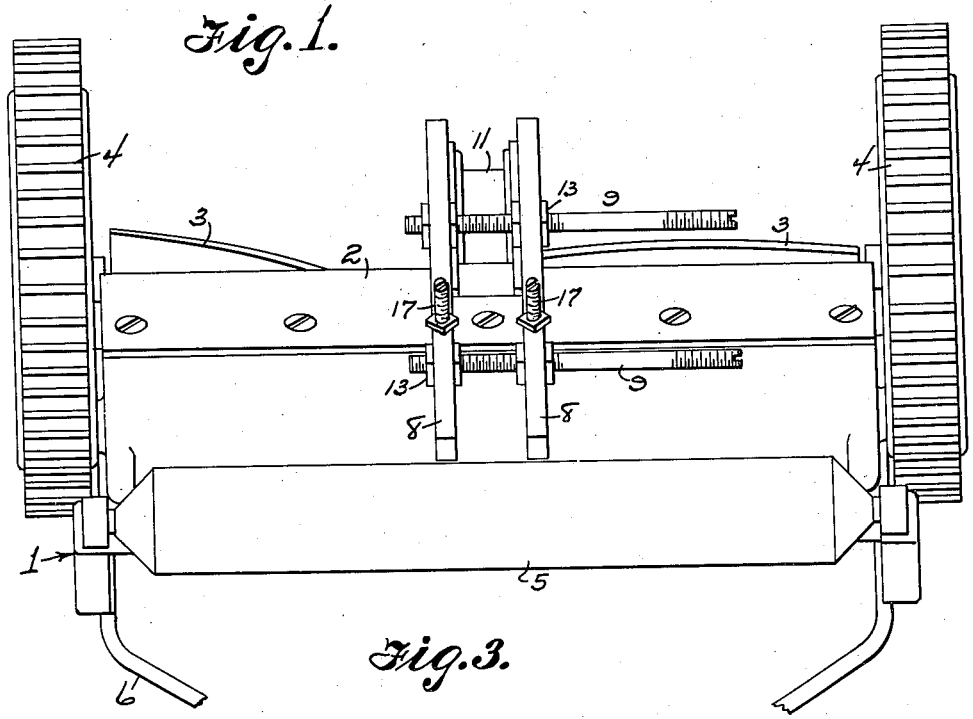
Figure 3:
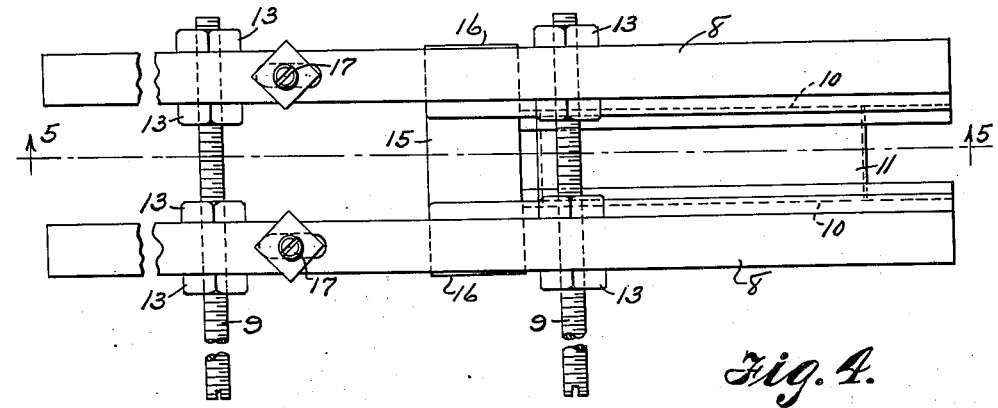
Figure 3 is a plan view illustrating the sharpener.

Referring in detail to the drawings, the numeral 1 indicates the conventional type of lawn mower wherein the stationary knife is shown at 2 and the rotating blades indicated by the character 3. The blades are driven in the usual manner from the ground wheels 4. The lawn mower further includes the usual roller 5 and handle 6. To sharpen the edges of the blades 3 my invention is employed by mounting the same upon the knife 2 with the lawn mower turned upside down and positioned on a suitable support 7.

Figure 4:
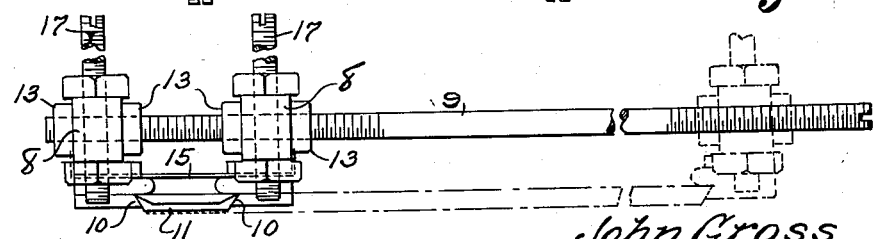
Figure 4 is a detail view showing the adjustment of my invention so as to accommodate sharpening or abrasive elements of different sizes.

My invention consists of spaced members 8 adjustably connected by tie bolts 9 and opposing faces of the members 8 are grooved, as shown at 10, to slidably receive an abrasive or sharpening element 11, opposite edges of which are beveled, as shown at 12, to fit the grooves 10. The tie bolts 9 permit the members 8 to be adjusted towards and from each other for the purpose of accommodating abrasive elements of different sizes and this adjustment is clearly set forth in Figure 4 wherein one size of abrasive element is shown in full lines, while another size is shown in dotted lines with the members 8 adjusted to accommodate the same. After the members have been adjusted to accommodate an abrasive element of a certain size they may be locked in their adjusted positions by nuts 13 threaded to the tie bolts and turned tightly against the respective members 8. The portions of the members 8 where the grooves are provided are of a greater thickness than the remaining portions of said members and one end of the thickened portion is slotted, as shown at 14, to receive the knife 2 of the lawn mower. A wear plate 15 is positioned in the slots 14 and has its ends 16 angularly related to engage the outer sides of the members 8. Screw threaded pins 17 are adjustably secured to the members 8 and are adapted to engage with the blade holder 18 of the lawn mower and also one edge of the blade 2 for the purpose of guiding the sharpener when moved transversely of the lawn mower during the sharpening of the blades 3.

In operation, the device is applied to the lawn mower, as shown in Figure 2, and the lawn mower is placed upon the support 7 and the wheels 4 are manually rotated to cause rotation of the blades 3 and the latter during their rotation have wiping contact with the abrasive element 11 and by sliding the members 8 transversely of the mower the blades may be sharpened throughout the entire length of the device.

While I have shown and described the preferred embodiment of my invention, it will be understood that minor changes in construction, combination and arrangement of parts may be made without departing from the spirit and scope of my invention, as claimed.

Having described the invention, I claim:

A lawn mower sharpener comprising spaced members having portions thereof of increased thickness and provided with aligning slots to receive a knife of a lawn mower, a wear plate contacting with the knife and having offset ends engaging said members, an abrasive plate slidably engaged with opposing faces of said members, threaded rods extending through said members, pairs of nuts threaded to the rods and engaging opposite faces of said members whereby the latter may be adjusted towards and from each other and locked against relative movement, and set bolts carried by said members to engage with the non-cutting edge of the knife during movement of the blades of the lawn mower over the abrasive plate with wiping contact therewith.

JOHN GROSS.